United States Patent Office 3,819,758
Patented June 25, 1974

3,819,758
POLYOLEFIN RENDERED DYE, RECEPTIVE WITH CAPPED POLYAMIDE, POLYAMIDO OR POLYESTER
James W. Cleary, Bartlesville, Okla., assignor to Phillips Petroleum Company
Original application Apr. 14, 1969, Ser. No. 815,914, now abandoned. Divided and this application Dec. 2, 1971, Ser. No. 210,167
The portion of the term of the patent subsequent to Nov. 18, 1988, has been disclaimed
Int. Cl. C08g 41/04
U.S. Cl. 260—857 L                                              2 Claims

ABSTRACT OF THE DISCLOSURE

Polyamides, polyamidoesters or polyesters which have been capped, so that there remain substantially no free carboxylic acid groups in the molecules, as by reaction of the polymer molecule with a primary or secondary monoamine and/or a monocarboxylic acid either during the basic reaction forming the polymer or thereafter, and used as improved dye receptors in a polyolefin, e.g. polypropylene, have been found to considerably improve and visually noticeably to the dye receptivity and dye retention of the polyolefin.

---

This is a division of application Ser. No. 815,914, filed Apr. 14, 1969, now abandoned.

This invention relates to capped polyamides. It also relates to the use of a capped polyamide as a dye receptor in a polyolefin, e.g. polypropylene.

In one of its concepts, the invention provides a process for capping a polyamide as can be obtained by polycondensing a complex diamine or an aminoalcohol with a dicarboxylic acid by reacting same either during the basic reaction or thereafter with a primary or secondary monoamine and/or a monocarboxylic acid.

According to another concept of the invention such a capped polyamide as herein disclosed is used to improve dye receptivity of a polyolefin, e.g. polypropylene.

It is known that certain materials such as polyolefins, more especially polypropylene, are difficult to dye. To this end there have been developed dye receptors which are incorporated into the polyolefin. For example, dye receptivity of polypropylene is improved by addition of from about 1 to 20 parts by weight per 100 parts of the polymer of a product obtaining by polycondensing a complex diamine or aminoalcohol with a dicarboxylic acid. The improving of the dye receptivity of a polyolefin, such as polypropylene, by adding specific polyamides, polyesters, or polyamidoesters is disclosed in my application Ser. No. 640,186, filed May 22, 1967, now abandoned and continued in continuation-in-part application, Ser. No. 868,276, now Pat. 3,621,075.

The invention of the present case provides a "capped" product obtained by chemically capping certain polyamides, polyamidoesters or polyesters of said Ser. No. 640,186. These polyamides, polyamidoesters or polyesters are produced by polycondensing one of two types of complex diamines or difunctional aminoalcohols with a dicarboxylic acid to form polymeric compositions which of themselves have an improved dye receptivity.

The dicarboxylic acids that can be used contain 3 through 36 carbon atoms and have the formula:

HOOC—R—COOH where R is a divalent radical free from olefinic and acetylenic unsaturation. The radical can be acyclic, alicyclic, aromatic, oxygen-, sulfur- or nitrogen-containing heteroacyclic or heterocyclic having no N—H, S—H, or OH bonds, and, if not aromatic, can contain substituent aromatic groups such as phenyl or naphthyl.

Representative examples of acids that can be used to produce the dye receptive modifiers which are capped according to this invention to considerably further improve their dye receptivity and dye retention are malonic, succinic, glutaric, adipic, pimalic, suberic, azelaic, sebacic, 1,12-dodecanedioic, 1,18-octadecanedioic, dimerized oleic acid, 3,3-dimethylglutaric, 2,2,4-trimethyladipic, 1,4-cyclohexanedicarboxylic, 3-phenyladipic, 4-α - naphthylsuberic, 1-naphthyl-2,4-cyclopentanedicarboxylic, phthalic, terephthalic, isophthalic, phenylenediacetic, 1,4-naphthalenedicarboxylic, 4-methylphthalic, methylimino-bispropionic, 2,5-pyridinedicarboxylic, N-ethyl-2,4-piperidinedicarboxylic, N-propyl-2,5 - pyrrolidinedicarboxylic, thiodiglycolic, 3,3'-thiodipropionic, 4,4'-sulfonyldibenzoic, 4,4'-sulfoxyldibenzoic, diglycolic, 3,3'-oxodipropionic.

The complex diamines and difunctional aminoalcohols that can be used to produce the polyamides, polyamidoesters or polyesters used in this invention are selected from the group having the general structural formulae:

(I)

or (II)

in which R' is selected from the group comprising (1) straight or branched alkylene groups and cycloalkyl- or aryl-substituted derivatives thereof having a total of 1 through 16 carbon atoms, (2) cycloalkylene groups and alkyl-, cycloalkyl-, or aryl-substituted derivatives thereof having a total of 4 through 16 carbon atoms, or (3) arylene groups and alkyl-, cycloalkyl-, or aryl-substituted derivatives thereof having a total of 6 through 18 carbon atoms, R' being the same or different members of said R' group; Y is selected from the group comprising —H, —R'NH$_2$, or —R'OH, Y being the same or different radicals within said Y group; each Z is ≡CH or ≡N; $x$ is 0 or 1.

Representative examples of type I compounds are:
bis(2-pyrrolidyl)methane,
bis(2-pyrrolidyl)propane,
bis(2-piperidyl)methane,
bis(4-piperidyl)methane,
2-piperidyl-(4-piperidyl)methane,
1,3-di(5-ethyl-2-piperidyl)propane,
1,3-di(5-methyl-2-piperidyl)propane,
2,2-di(2-piperidyl)propane,
2,2-di(4-piperidyl)propane,
2-(2-piperidyl)-2-(4-piperidyl)propane,
1,3-di(2-piperidyl)propane,
1,3-di(4-piperidyl)propane,
1-(2-piperidyl)-3-(4-piperidyl)propane,
1,3-di(4-piperidyl)-2,2-dimethylpropane,
1,3-di(2-methyl-4-piperidyl)propane,
1,3-di(4-piperidyl)-2-cyclohexylpropane,
1,3-di(4-piperidyl)-2,2-dicyclohexylpropane,
1,3-di(4-cyclohexyl-2-piperidyl)propane,
1,3-di(2,6-dicyclohexyl-4-piperidyl)propane,
1,3-di(3-aminopropyl-4-piperidyl)propane,
1,3-di(3-amino-2-methylpropyl-4-piperidyl)propane,
1-(4-piperidyl-3,3-aminopropyl-4-piperidyl)propane,
1,3-di(N-2-hydroxyethyl-4-piperidyl)propane,
1,3-di(N-2-hydroxypropyl-4-piperidyl)propane,
1-(4-piperidyl)-3-(N-2-hydroxyethyl-4-piperidyl)propane,
1,3-di(N-2-hydroxy-1-phenylethyl-4-piperidyl)propane,
bis(1-piperazinyl)methane, 1,3-bis[1-(1,2-diazocyclopentane)]propane,
1-[4-(3-aminopropyl)piperidyl]-16-[4-(2-hydroxyethyl)piperazinyl]hexadecane, and the like.

Representative examples of type II compounds are:
pyrazolidine,
3-methylpyrazolidine,
3,5-dimethylpyrazolidine,
imidazolidine,
2-methylimidazolidine,
4,5-dimethylimidazolidine,
piperazine,
2-methylpiperazine,
2,5-dimethylpiperazine,
2,6-dimethylpiperazine,
2-cyclohexylpiperazine,
2-phenylpiperazine,
2,5-dicyclohexylpiperazine,
2,3-diphenylpiperazine,
2,5-diphenylpiperazine,
1,2-diazocyclohexane,
3,6-dicyclohexyl-1,2-diazocyclohexane,
3,6-diphenyl-1,2-diazocyclohexane,
1,3-diazocyclohexane,
2-phenyl-1,3-diazocyclohexane,
4,6-diphenyl-1,3-diazocyclohexane,
bis(N-3-aminopropyl)piperazine,
bis(N-3-amino-2-methylpropyl)piperazine,
1-(N-3-aminopropyl)piperazine,
bis(N-2-hydroxyethyl)piperazine,
bis(N-2-hydroxypropyl)piperazine,
1-(N-2-hydroxyethyl)piperazine,
bis(N-2-hydroxy-1-phenylethyl)piperazine,
1,2,3,4,5-pentahydrocyclopentapyrimidine,
6,8-diazaspiro[4.5]decane,
1,3-diazaspiro[4.5]decane,
2,3-diaza-2-(2-aminoethyl)-3-(4-hydroxybutyl)-spiro[4.5]decane, and the like.

The dye receptive modifiers which are capped according to this invention to considerably further improve their dye receptivity and dye retention can be prepared using mixtures of two or more of the diamines and difunctional aminoalcohols and two or more of the dicarboxylic acids described above. The operating conditions for the polycondensation reaction for the preparation of the polyamides, polyamidoesters or polyesters are well known, being described, for example, in U.S. 2,149,273, which issued on Mar. 7, 1939, and U.S. 2,130,947, which issued on September 30, 1938. For the sake of completeness, the disclosures of those two patents are incorporated by reference herein. The reaction may be performed in one step or may include the formation of a salt as an intermediate step between the reaction of the initial ingredients and the production of the desired polyamides, polyamidoesters or polyesters therefore as described in U.S. 2,130,927. For example, when a one step reaction is used the polyamide, polyamidoester or polyester can be prepared by heating approximately equimolar amounts of diamine or difunctional aminoalcohol and dicarboxylic acid at a temperature in the range of 210 to 575° F., preferably 300 to 540° F., in the presence or absence of suitable solvents or diluents with or without suitable condensing agents, at superatmospheric, atmospheric or subatmospheric pressure for periods of 0.1 to 50 hours. The reaction is preferably carried out in the absence of air and sometimes the addition of antioxidants is desirable. A small excess of either the diamine or difunctional aminoalcohol or the dicarboxylic acid can be used to control the extent of reaction. The product of reaction has an inherent viscosity in methyl alcohol or meta-cresol at 30° C. in the range of 0.05 to 1.0 dl./g.

I have now found that at least equal but generally much better improvement in dye receptivity is obtained and that the processability of the polyolefin, especially of polypropylene, is improved if the dye receptor polymer molecules are capped as indicated in the first paragraph such that there are no free carboxylic acid groups in the molecules. For example, with the capped molecules there is less deposition of dye receptor material on the draw rolls during melt spinning. Also, the capped products of my invention yield a higher color, readily seen by the human eye.

Other $C_2$ to $C_8$ polyolefins such as polyethylene, poly(1-butene), poly(3-methyl-1-butene), poly(3-methyl-1-pentene), poly(1-octene), and the like can be used, alone, mixed with each other, or mixed with polypropylene.

It is an object of this invention to provide capped polyamide. It is another object of this invention to provide improved dye receptors for a polyolefin, such as polypropylene. It is a further object of this invention to provide a process for capping polyamides. It is a still further object of this invention to provide a process for improving the dye receptivity of a polyolefin, such as polypropylene.

Other aspects, concepts, objects, and the several advantages of this invention are apparent from a study of this disclosure and the appended claims.

According to the present invention, there is employed a monocarboxylic acid, a primary monoamine, $RNH_2$, or a secondary monoamine, $R(R')NH$, or a combination of these to cap the product of polycondensation of a complex diamine or an aminoalcohol with a dicarboxylic acid, e.g., to cap a polyamide thus formed. In the formulas R and R' are hydrocarbyl groups containing 1 to 24 carbon atoms, and are independently selected from the group consisting of alkyl, aryl, cycloalkyl, and combinations thereof such as alkaryl, aralkyl, and the like.

Any monocarboxylic acid and any primary or secondary monoamine can be used in the process of the invention. Examples of carboxylic acids that can be used are acetic, propionic, octoic, benzoic, pelargonic, stearic, phenylstearic, cyclohexane carboxylic acid, and the like. Examples of amines that can be used are piperidine, 2-, 3-, or 4-methylpiperidine, 2,6-dimethylpiperidine, 4-phenylpropylpiperidine, stearylamine, benzylamine, dibenzylamine, and the like.

The mol ratios of the various amines and acids that can be used during preparation of the dye receptor additives of the invention can best be arrived at by a discussion of the various types of capped polymer molecules that can be formed. Let M = monoamine
D = diamine, aminoalcohol, or dialcohol
A' = monocarboxylic acid
A'' = dicarboxylic acid Molecules of the following types are formed in the polycondensation with capping material present:

| | |
|---|---|
| $MA''(DA'')_nM$ | I |
| $A'D(A''D)_nA'$ | II |
| $M(A''D)_nA'$ | III | where $n$ is an integer having a value of 1 to 100. Mol ratios of the various reactants for $n=1$ and for $n=100$ are:

| Formula | $n=1$ | | | $n=100$ | | |
|---|---|---|---|---|---|---|
| | I | II | III | I | II | III |
| M | 2 | 0 | 1 | 2 | 0 | 1 |
| D | 1 | 2 | 1 | 100 | 101 | 100 |
| A' | 0 | 2 | 1 | 0 | 2 | 1 |
| A'' | 2 | 1 | 1 | 101 | 100 | 100 |

It is apparent that intermediate values of $n$ require intermediate mol ratios.

Formulas for the capped polymers of Formula I, in which $Y = R'NH_2$ and capping is with monoamine only, monocarboxylic acid only or with monoamine at one end and with monocarboxylic acid at the other end are:

Monoamine at both ends

Acid at both ends

Acid at one end, monoamine at other $$RNH-\left[\text{Bracketed formula same as above}\right]-\overset{O}{\overset{\|}{C}}R$$

Although mol ratios between those shown for $n=1$ and for $n=100$ are usually used, it is within the scope of the invention to use mol ratios outside those ranges.

Polycondensation conditions, methods of mixing polypropylene and dye receptor, and the like, are the same as in the aforementioned copending case. The product of reaction has an inherent viscosity in methyl alcohol at 30 C. in the range of 0.05 to 1.0 dl./g.

EXAMPLE I

Several capped polyamides were prepared by mixing the indicated amounts of 1,3-di(4-piperidyl)propane (Dipip), adipic acid (Diacid), indicated capping monocarboxylic acid, and water in a stirred reactor, displacing the air with nitrogen, heating to the indicated temperature under autogenous pressure, venting to atmospheric pressure over about 30 minutes, and evacuating for 1.5 to 2.5 hours at 20+ inches of mercury:

EXAMPLE II

A noncapped polyamide of the above-mentioned copending application was prepared by mixing 30.2 lb. (0.144 lb. mol) of 1,3-di(4-piperidyl)propane, 23.1 lb. (0.158 lb. mol) of adipic acid, and 13.5 lb. (0.75 lb. mol) of deionized water in a 10-gallon mixer, discharging the mixture into a 30-gallon reactor at about 220 F., heating under autogenous pressure to 400 F. over a 162-minute period, and to 440 F. over an additional 58-minute period, depressuring from 350 p.s.i.g. to 0 p.s.i.g. over a 90-minute period, and degassing under 25 inches of mercury vacuum for 45 minutes at a temperature of 420-445 F. The product has an inherent viscosity in methyl alcohol at 30 C. of 0.19 dl./g.

EXAMPLE III

Finely-divided polypropylene with a melt flow of approximately 12 dg./min. (ASTM D 1238-62T, Condition L) and a density of 0.905 g./cc. (ASTM D 1505–63T) was prepared using a diethylaluminum chloride-$TiCl_3 \cdot \frac{1}{3} AlCl_3$ catalyst. Separate portions of the polypropylene were dry blended with 4 parts by weight per 100 parts of polymer (php.) of each of the capped polyamides, 0.05 php. 2,6-di-*tert*-butyl-4-methylphenol, 0.15 php. di-*n*-octadecyl-3,5-di-*tert*-butyl-4-hydroxybenzyl phosphonate, 0.3 php. distearylthiodipropionate, 0.2 php. $TiO_2$, and 0.5 php. of a UV stabilizer selected from the group consisting of 2-hydroxy-4-*n*-octoxybenzophenone and 2-(2-hydroxy-3,5-di-*tert*-butylphenyl)-5-chloro-2,1,3-benzotriazole. These dry-blended materials were fed through a ¾-inch Modern Plastics Machinery pelletizing extruder to a single-position spinning machine and melt spun into 8-filament yarn that was drawn at 240–290 F. with a draw ratio of 2.5–5:1 to produce 15-denier filaments. These yarns were knit into circular sleeve fabrics on a 300-needle Carolina Hosiery Knitter.

EXAMPLE IV

Portions of the fabrics of Example II were dyed in a

| Capped polyamide number | Mols | | Monocarboxylic acid | | Water, ml. | Temp., F. | Inherent viscosity [a] |
|---|---|---|---|---|---|---|---|
| | Dipip | Diacid | Name | Mols | | | |
| 1 | 0.60 | 0.54 | Benzoic | 0.12 | 55 | 500 | 0.18 |
| 2 | 0.60 | 0.54 | 2-ethylhexanoic | 0.12 | 55 | 400 | 0.17 |
| 3 | 0.60 | 0.54 | Octanoic | 0.12 | 56 | 400 | 0.18 |
| 4 | 1.00 | 0.90 | Pelargonic | 0.20 | 93 | 400 | 0.15 |
| 5 | 1.00 | 0.90 | Lauric | 0.20 | 95 | 400 | 0.14 |
| 6 | 1.00 | 0.90 | Phenylstearic [b] | 0.20 | 104 | 400 | 0.12 |
| 7 | 0.60 | 0.54 | Stearic | 0.12 | 59 | 500 | 0.13 |
| 8 | 1.00 | 0.90 | Mixed [c] | 0.20 | 100 | 400 | 0.14 |

[a] In methyl alcohol at 300.
[b] Mixture of 9- and 10-isomer.
[c] Emery Emersol-132, a mixture containing (typically) about 53% palmitic acid, 42% stearic acid, and 5% related saturated fatty acids (mostly $C_{14}$, $C_{15}$, and $C_{17}$); calculated as stearic acid.

Figure 1:
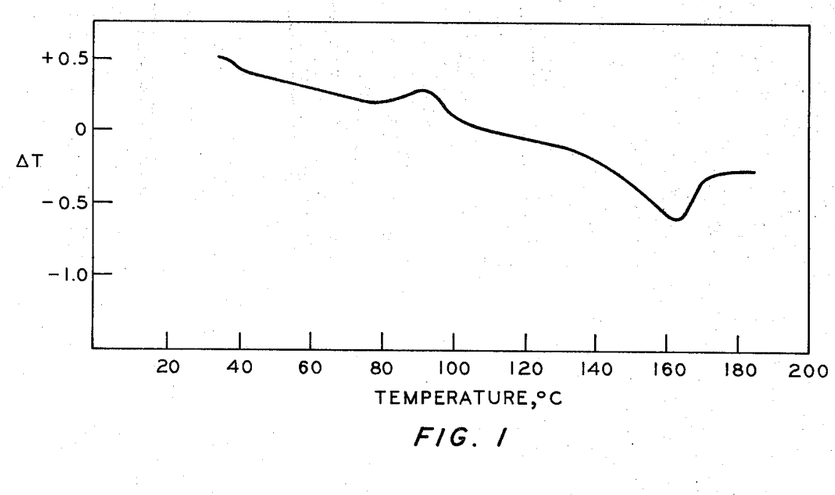
Figure 1A:
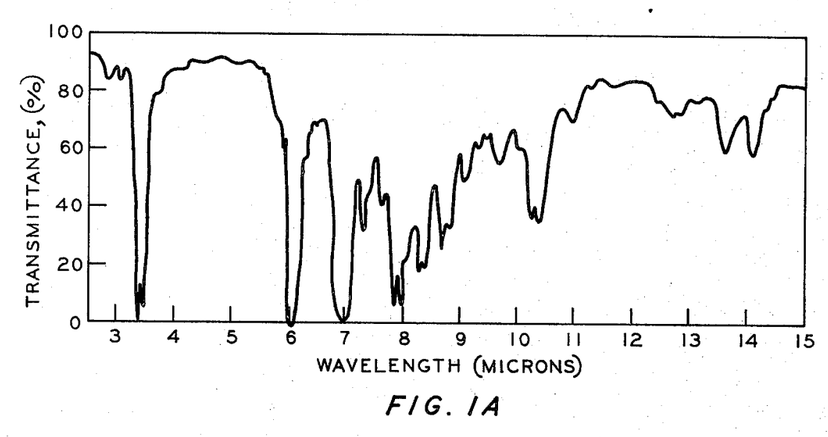
Figure 2:
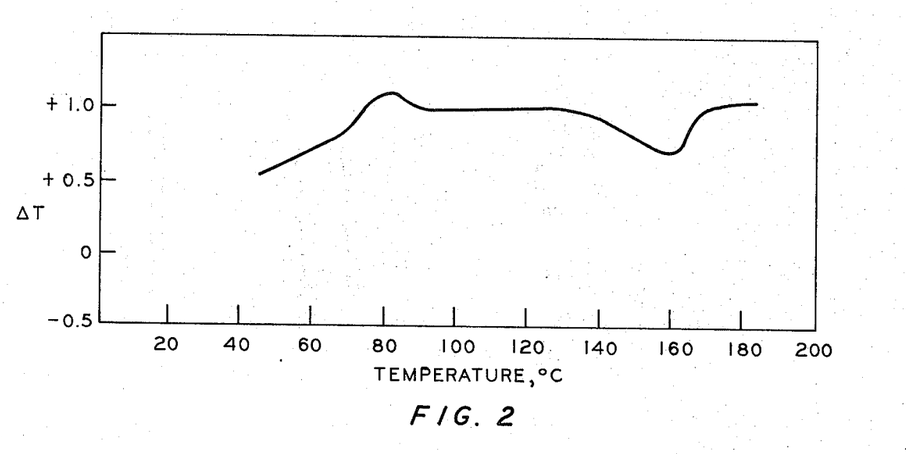
Figure 2A:
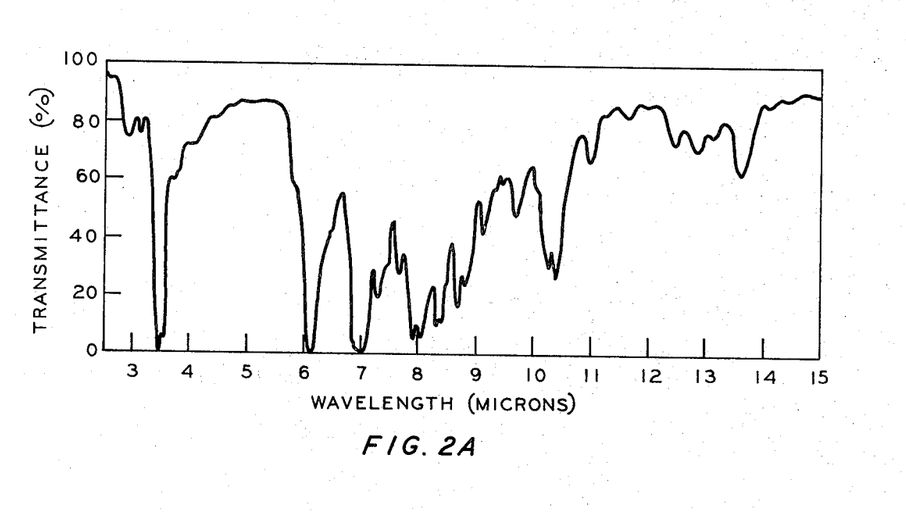
Figure 3:
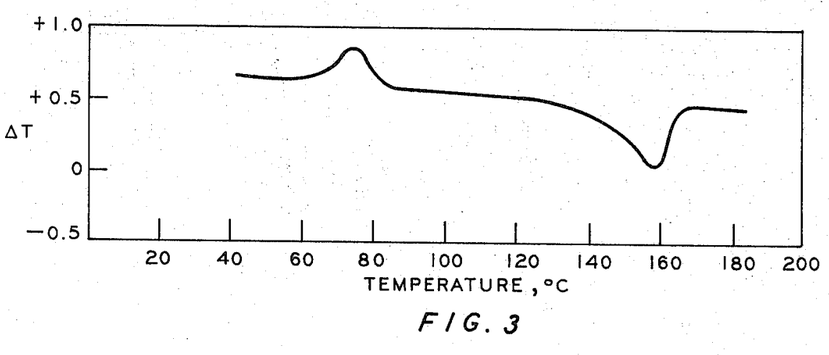
Figure 3A:
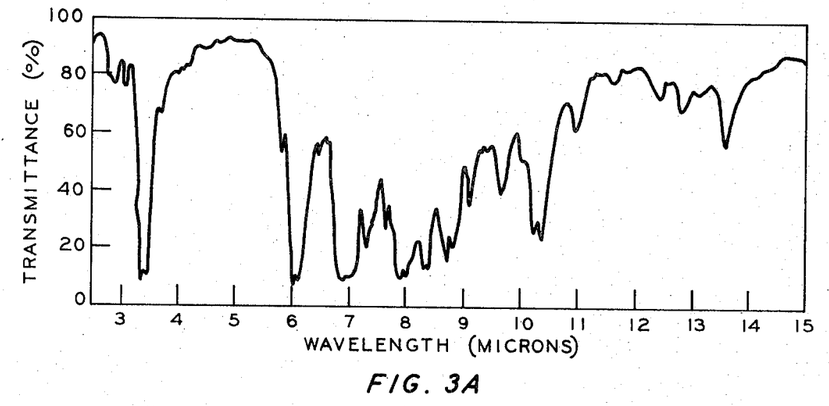
Figure 4:
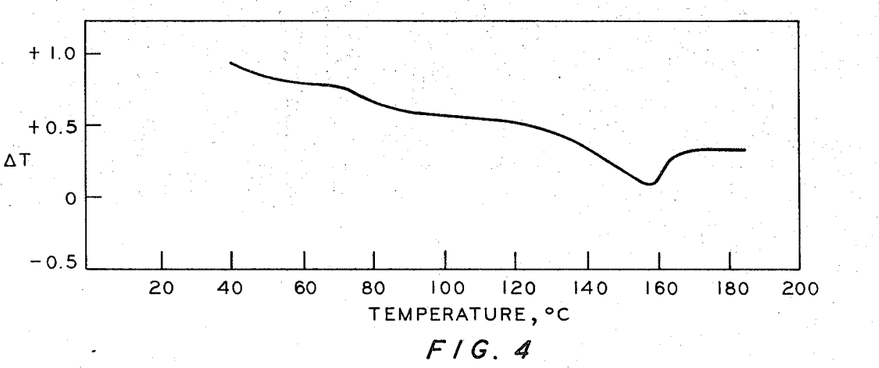
Figure 4A:
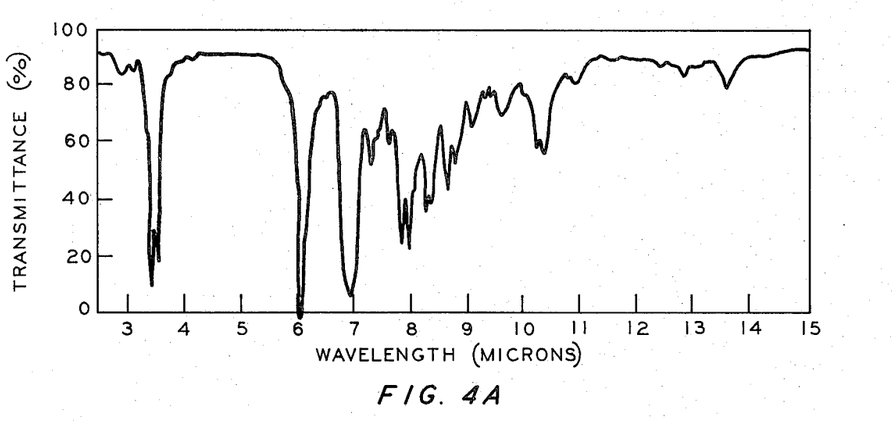
Figure 5:
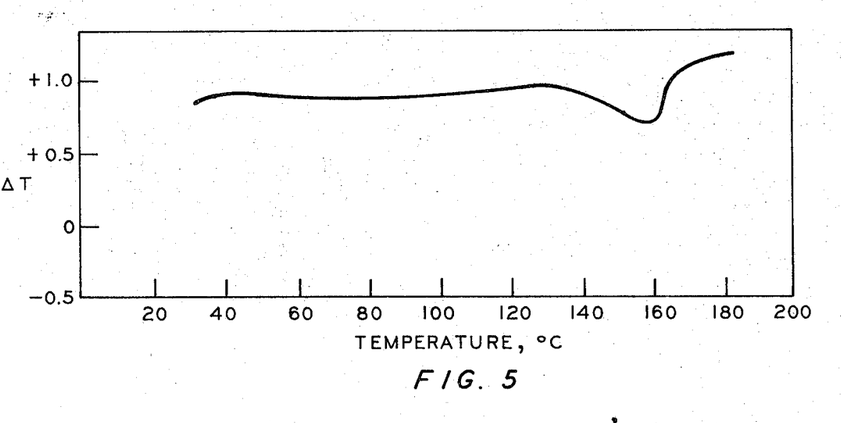
Figure 5A:
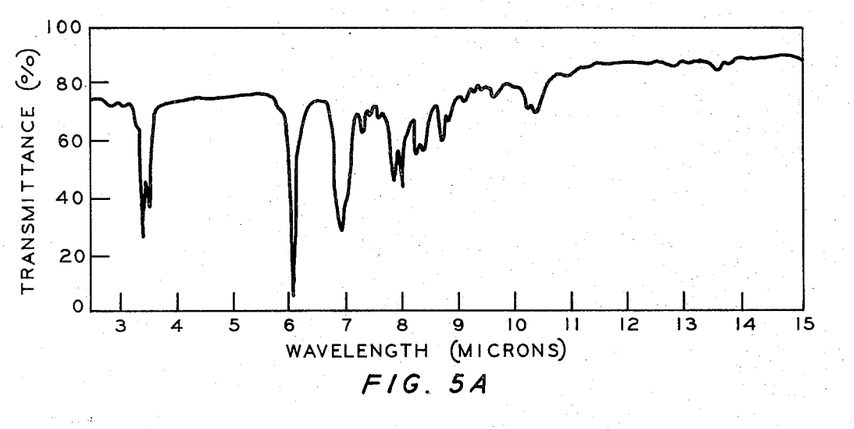
Figure 6:
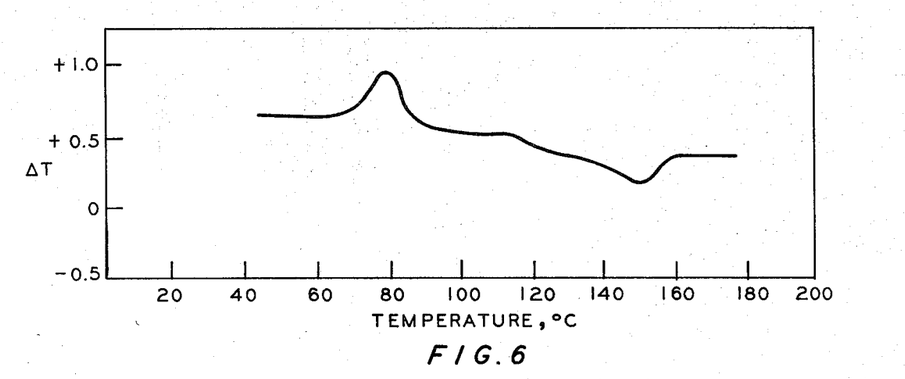
Figure 6A:
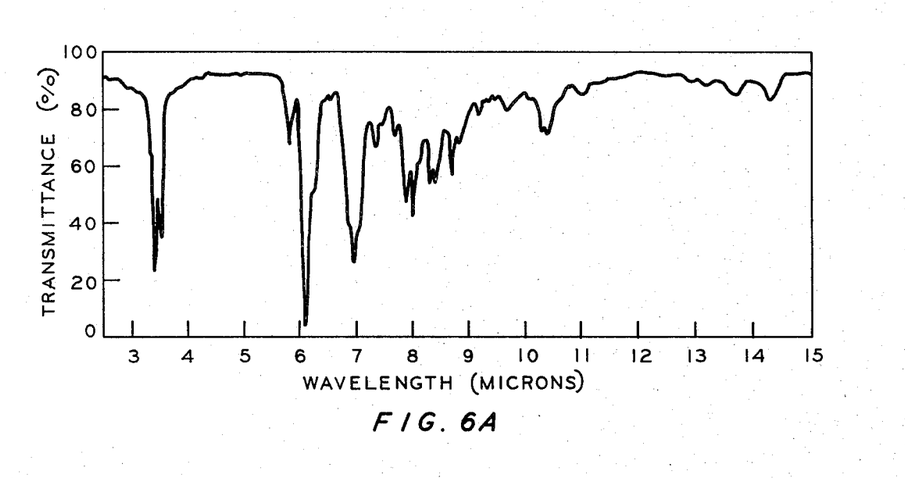
Figure 7:
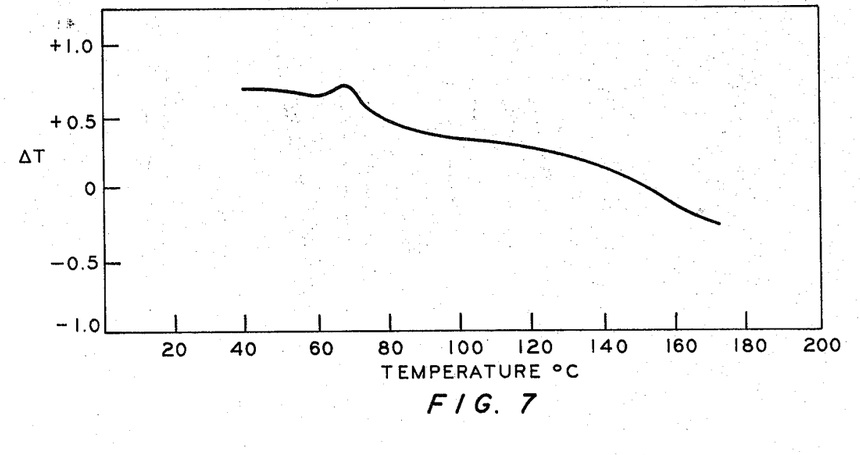
Figure 7A:
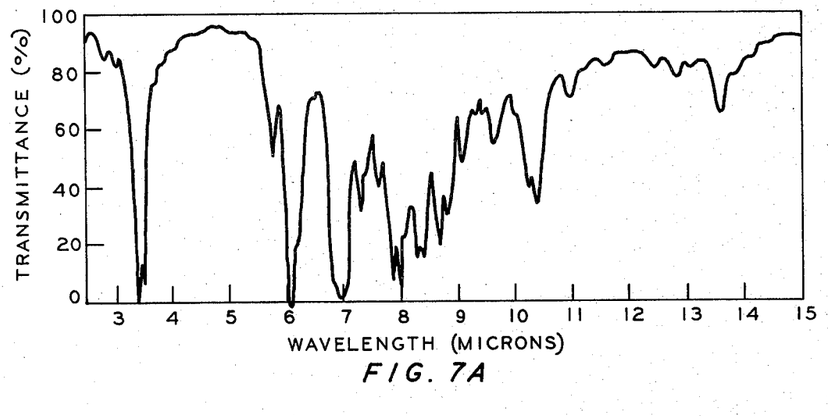
Figure 8:
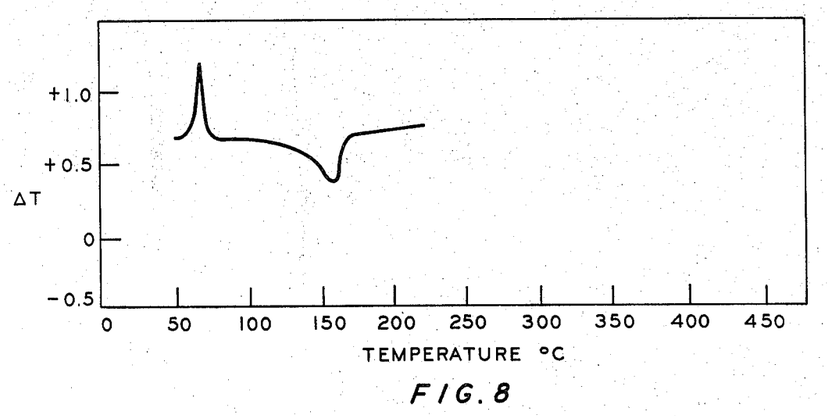
Figure 8A:
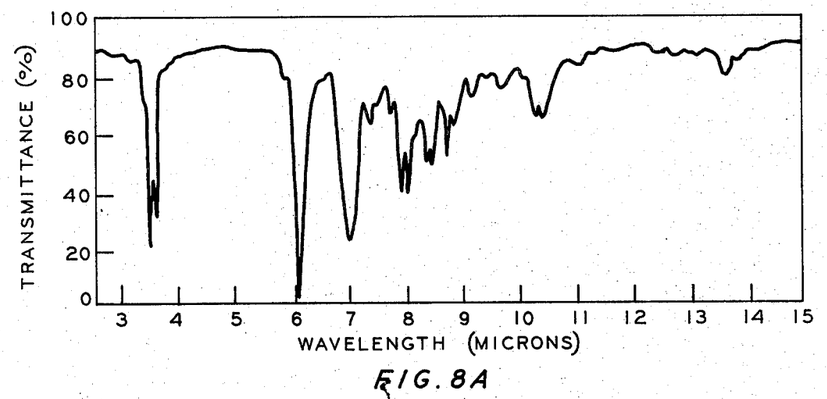

The capped polyamides numbers 1–8 inclusive are further identified in the figures of the drawing, in which FIGS. 1–8 are differential thermal analysis (DTA) graphs of capped polyamides 1–8, respectively, and in which FIGS. 1A–8A are infrared spectrum analysis curves of capped polyamides 1–8, respectively. The DTA graphs were determined at a heating rate of 10° C. per minute, starting at room temperature, using a Du Pont 900 Differential Thermal Analyzer. The infrared spectra were determined with a Perkin-Elmer Infracord Model 137 infrared spectrometer.

Gibbs dye bath at a 50:1 water to fabric liquor ratio (ml./g.) with either 2 percent Ciba Terasil Blue BGL (a disperse dye) or 0.5 percent Ciba Avilon Fast Navy Blue R (a metallized disperse dye), both calculated on the weight of the fabric (OWF). The dye bath also contained 0.5 weight percent of an alcohol ether medium sulfate, anionic textile detergent, Duponol RA, calculated on the weight of the dye. The pH of the dye bath was adjusted to 5 by the addition of formic acid. The fabric samples were dyed by submerging them in the dye bath, raising the temperature of the bath to 205 F., and maintaining that temperature for one hour. The fabric samples were removed from the dye bath, rinsed with running water until clear, and after-scoured with 2 weight percent (OWF) of Duponol RA at a 50:1 water to fabric ratio for 15 minutes at 120 F. The results obtained with the various capped polyamides are:

polyamide which is capped being produced by polycondensing a complex diamine having the general formula:

| | K/S [a] | | Dry cleaning fastness [b] | | Light fastness [c] | |
|---|---|---|---|---|---|---|
| | Terasil Blue BGL | Avilon Fasr Navy Blue R | Terasil Blue BGL | Avilon Fast Navy Blue R | Terasil Blue BGL | Avilon Fast Navy Blue R |
| Capped polyamide number: | | | | | | |
| 1 | 9.4 | 2.6 | 3 | 4-5 | 20 | 80 |
| 2 | 9.4 | 3.0 | 2-3 | 4 | | |
| 3 | 9.0 | 2.3 | 1-2 | 4 | | |
| 4 | 8.6 | 3.1 | 2 | 3 | | |
| 5 | 8.6 | 3.2 | 1 | 2 | | |
| 6 | 8.5 | 2.4 | 1 | 2 | | |
| 7 | 9.4 | 3.2 | 2-3 | 5 | 20 | 50 |
| 8 | 9.0 | 3.4 | 2 | 4 | | |
| Non-capped [d] | 8.0 | 2.1 | 3 | 5 | 20 | 20 |

[a] Measured on an Instruments Development Laboratory Model D-1 Color Eye. Reflectance (R) at the wavelength of maximum absorbance is measured, and the K/S values are equal to $(1-R)^2/2R$. Larger numbers represent better color yield.
[b] AATCC Method 85-1963. Higher numbers represent better dry cleaning fastness.
[c] AATCC Method 16E-1964T. Higher numbers represent better light fastness.
[d] Preparation described in Example II. Blended with polypropylene as described in Example III.

The difference between K/S values of 8.0 and of say 8.5 is quite real and can be readily detected by the human eye.

EXAMPLE V

A capped polyamide was made using 1.00 ml. of dipip, 0.90 mol of diacid, 0.20 mol of stearic acid, 104 ml. of water, and a temperature of 425° F. It was made in the same manner as recited in Example I except that the stearic acid was not added until after the venting operation. The final product had an inherent viscosity of 0.15.

Reasonable variation and modification are possible within the scope of the foregoing disclosure of invention and appended claims to the invention, the essence of which is that capped polyamides have been provided and that these capped polyamides are used as improved dye receptors for a polyolefin, or a mixture, as described, e.g. polypropylene or a mixture thereof with another polyolefin.

I claim:

1. A polymer of a 1-olefin having 2 through 8 carbon atoms per molecule rendered dye receptive by incorporating therein 1 to about 20 parts by weight per 100 parts of the polymer of a capped polyamide which has been obtained by polycondensing a complex diamine with a dicarboxylic acid, the ends of said polyamide having been capped by reaction with a primary monoamine, $RNH_2$ or secondary monoamine $R(R')NH$ and/or a monocarboxylic acid RCOOH, wherein R and R' are hydrocarbyl groups containing 1 to 24 carbon atoms, and are independently selected from the group consisting of alkyl, aryl, cycloalkyl, and combinations thereof, the inherent viscosity of said capped polyamide in methyl alcohol or meta-cresol at 30° C. being in the range 0.05 to 1 dl./g., wherein the capping agent is in the range 1–100 mol percent based upon the total diacid and diamine present, the polyamide which is capped being produced by polycondensing a complex diamine having the general formula:

in which R' is a divalent member selected from the group consisting of (1) straight or branched alkylene groups and cycloalkyl- or aryl-substituted derivatives thereof having a total of 1 throuh 16 carbon atoms, (2) cycloalkylene groups and alkyl-, cycloalkyl-, or aryl-substituted derivatives thereof having a total of 4 through 16 carbons, or (3) arylene groups and alkyl-, cycloalkyl-, or aryl-substituted derivatives thereof having a total of 6 through 18 carbon atoms, R' being the same or different members of said R' group; x is 0 or 1, with a hydrocarbon dicarboxylic acid to form polymeric compositions which of themselves have an improved dye receptivity, the dicarboxylic acids used containing 3 through 36 carbon atoms and having the formula:

HOOC—R—COOH wherein R is a divalent radical free from olefinic or acetylenic unsaturation, the radical can be acyclic, alicyclic, aromatic, and, if not aromatic, can contain substituent aromatic groups such as phenyl or naphthyl.

2. A composition according to claim 1 wherein the 1-olefin is propylene.

References Cited

UNITED STATES PATENTS 3,621,075  11/1971  Cleary ___________ 260—857 L
2,174,527  10/1939  Peterson __________ 260—78

JOHN C. BLEUTGE, Primary Examiner

U.S. Cl. X.R.

260—45.75, 45.85, 45.95, 78 R, 78 S, 895